United States Patent
Xie

(10) Patent No.: US 12,413,676 B1
(45) Date of Patent: Sep. 9, 2025

(54) GATEWAY DEVICE AND METHOD FOR MANAGING VOICE CALLS

(71) Applicant: TP-Link Systems Inc., Irvine, CA (US)

(72) Inventor: Ping Xie, Shenzhen (CN)

(73) Assignee: TP-Link Systems Inc., Irvine, CA (US)

(*) Notice: Subject to any disclaimer, the term of this patent is extended or adjusted under 35 U.S.C. 154(b) by 0 days.

(21) Appl. No.: 18/967,643

(22) Filed: Dec. 3, 2024

(51) Int. Cl.
*H04M 7/00* (2006.01)
*H04M 7/12* (2006.01)

(52) U.S. Cl.
CPC ......... *H04M 7/0006* (2013.01); *H04M 7/006* (2013.01); *H04M 7/126* (2013.01)

(58) Field of Classification Search
None
See application file for complete search history.

(56) References Cited

U.S. PATENT DOCUMENTS

| | | | |
|---|---|---|---|
| 6,404,764 B1 * | 6/2002 | Jones | H04M 1/725 370/352 |
| 2015/0163701 A1 * | 6/2015 | Yenamandra | H04W 36/302 370/332 |

FOREIGN PATENT DOCUMENTS

| | | |
|---|---|---|
| CN | 101184292 A | 5/2008 |
| CN | 102783244 B | 1/2015 |
| CN | 104969529 B | 7/2018 |
| CN | 111917453 B | 9/2022 |
| WO | WO-2007091264 A1 * | 8/2007 .......... H04M 7/0069 |

* cited by examiner

*Primary Examiner* — Hemant S Patel
(74) *Attorney, Agent, or Firm* — Loeb & Loeb LLP

(57) ABSTRACT

The present disclosure provides a method for managing voice calls and gateway device. A gateway device according to the embodiment of the present disclosure includes a voice call module for being connected with a landline device and/or a mobile voice device and configured to provide a calling out service to the landline device and/or the mobile voice device; a cellular session initiation protocol (SIP) client module for being connected with a cellular network and configured to process voice signalling in a cellular network; an IP network SIP client module for being connected with an IP network and configured to process voice signalling in an IP network; and a voice call selection module configured to, when receiving a calling out from the voice call module, select either the cellular SIP client module or the IP network SIP client module for the calling out.

15 Claims, 8 Drawing Sheets

GATEWAY DEVICE AND METHOD FOR MANAGING VOICE CALLS

TECHNICAL FIELD

The present disclosure relates to a gateway device and a method for managing voice calls, and more specifically, to a gateway device which can process voice signalling in a cellular network and an IP network and a method for managing voice calls at the gateway device.

BACKGROUND

The Long Term Evolution (LTE) gateways are connected with an LTE cellular network to support the voice call services with Voice over Long Term Evolution (VoLTE). On the other hand, when a UE is connected to a IP network, the IP network may provide the voice call services with Voice over IP (VoIP).

Currently, most of the Long Term Evolution (LTE) gateways do not support the VoIP. Although some gateways may support both of the voice call services with VoLTE and the voice call services with VoIP, the VoLTE module and the VoIP module in the gateways cannot work at the same time, or two sets of slic chips for implementing the VoLTE function and the VoIP function respectively are required. Thus, the cost of the gateway is increased.

For example, for the gateway device which is a single board device, the VoLTE module and the VoIP module in the gateways cannot work at the same time. Moreover, a hardware switch module is needed to switch the slic chip in the gateway used for the VoLTE module or the VoIP module. Thus, the cost of the gateway is increased.

For another example, for the gateway device which is a penalized board device, two sets of slic chips are needed for the VoLTE module and the VoIP module respectively. Thus, the cost of the gateway is also increased.

SUMMARY

In view of the above, the present disclosure a gateway device which can process voice signalling in a cellular network and an IP network and a method for managing voice calls at the gateway device.

According to an aspect of the present disclosure, there is a gateway device, comprising a voice call module for being connected with a landline device and/or a mobile voice device and configured to provide a calling out service to the landline device and/or the mobile voice device; a cellular session initiation protocol (SIP) client module for being connected with a cellular network and configured to process voice signalling in a cellular network; an IP network SIP client module for being connected with a IP network and configured to process voice signalling in an IP network; and a voice call selection module configured to, when receiving a calling out from the voice call module, select either the cellular SIP client module or the IP network SIP client module for the calling out based on statuses of the cellular SIP client module and the IP network SIP client module.

In some embodiments, the voice call selection module is configured to select the cellular SIP client module or the IP network SIP client module for the calling out further based on priorities of the cellular network and the IP network.

In some embodiments, the voice call selection module is further configured to generate a call fail message when neither of the cellular SIP client module and the IP network SIP client module is idle.

In some embodiments, the voice call module comprises: one or more landline units, wherein each of the one or more landline units is for being connected with a landline device and configured to provide a calling out service to the landline device, and one or more mobile voice units, wherein each of the one or more mobile voice units is for being connected with a mobile voice device and configured to provide a calling out service to the mobile voice device.

In some embodiments, the voice signalling is volte and/or Voice over New Radio (VoNR) signalling, and the voice signalling is VoIP signalling.

In some embodiments, each of the one or more landline units is further configured to provide a calling in service to the landline device; each of one or more mobile voice units is further configured to provide a calling in service to the mobile voice device; and the voice call selection module is further configured to, when receiving a calling in from the cellular SIP client module or the IP network SIP client module, select one of the one or more landline units or one of the one or more mobile voice units for the calling in based on statuses of the one or more landline units and the mobile voice units.

In some embodiments, the voice call selection module selects one of the one or more landline units or one of the one or more mobile voice units for the calling in further based on priorities of the landline units and/or the mobile voice units.

In some embodiments, the gateway device further comprises a voicemail module. Moreover, the voice call selection module is further configured to provide the calling in to the voicemail module, when none of the one or more landline units or the one or more mobile voice units is idle.

In some embodiments, each of the one or more landline units correspond to a kind of landline network.

According to another aspect of the present disclosure, there is provided a method for managing voice calls at a gateway device, wherein the gateway device comprises: a voice call module for being connected with a landline device and/or a mobile voice device and configured to provide a calling out service to the landline device and/or the mobile voice device; a cellular session initiation protocol (SIP) client module for being connected with a cellular network and configured to process voice signalling in a cellular network; an IP network SIP client module for being connected with a IP network and configured to process voice signalling in an IP network, and the method comprises: receiving a calling out from the voice call module, and selecting either the cellular SIP client module or the IP network SIP client module for the calling out based on statuses of the cellular SIP client module and the IP network SIP client module.

In some embodiments, the method further comprises: selecting the cellular SIP client module or the IP network SIP client module for the calling out further based on priorities of the cellular network and the IP network.

In some embodiments, the method further comprises: generating a call failed message, when neither of the cellular SIP client module and the IP network SIP client module is idle.

In some embodiments, the voice call module comprises: one or more landline units, wherein each of the one or more landline units is for being connected with a landline device and configured to provide a calling out service to the landline device, and one or more mobile voice units, wherein each of the one or more mobile voice units is for being connected with a mobile voice device and configured to provide a calling out service to the mobile voice device, each of the one or more landline units is further configured to provide a calling in service to the landline device, each of one or more mobile voice units is further configured to provide a calling in service to the mobile voice device. Moreover, the method further comprises: receiving a calling in from the cellular SIP client module or the IP network SIP client module, and selecting one of the one or more landline units or one of the one or more mobile voice units for the calling in based on statuses of the one or more landline units and the mobile voice units.

In some embodiments, the mothed further comprising selecting one of the one or more landline units or one of the one or more mobile voice units for the calling in further based on priorities of the landline module and/or the mobile voice device module.

In some embodiments, the gateway device further comprises a voicemail module, the method further comprises: providing the calling in to the voicemail module, when none of the one or more landline units or the one or more mobile voice units is idle.

At least based on the above embodiments of the present disclosure, an improved mechanism of voice call selection in the gateway is provided. The present disclosure is to leverage the characteristic of the independently set session initiation protocol (SIP) client modules for the voice signalling in a cellular network and for the voice signalling in an IP network, and the voice call selection module in the gateway device which may select either the cellular SIP client module or the IP network SIP client module for the calling out based on statuses of the cellular SIP client module and the IP network SIP client module. For example, the statuses of the cellular SIP client module and the IP network SIP client module may include the idle state and/or the busy state of the cellular SIP client module and the IP network SIP client module. Thus, if the IP network SIP client module is in the busy state, the voice call selection module may select the cellular SIP client module for the voice call when the voice call selection module is in the idle state, vice versa. Therefore, the cellular session initiation protocol (SIP) client module configured to process voice signalling in a cellular network and the IP network SIP client module configured to process voice signalling in an IP network can work at the same time, without considering the gateway device is a single board device or a penalized board device.

Moreover, according to the embodiments of the present disclosure, since the voice call selection module in the gateway device which may select one of the cellular SIP client module and the IP network SIP client module for the calling out from the voice call module, the cellular SIP client module and the IP network SIP client module may share the voice call module. That is, the cellular SIP client module and the IP network SIP client module may share one set of slic chip and voice interface without the requirement of the hardware switch module. Thus, it is not necessary to arrange a set of slic chip and voice interface for each of the cellular SIP client module and the IP network SIP client module. Therefore, the cost of the gateway may be reduced.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements. In the accompanying drawings.

DETAILED DESCRIPTION

Figure 1:
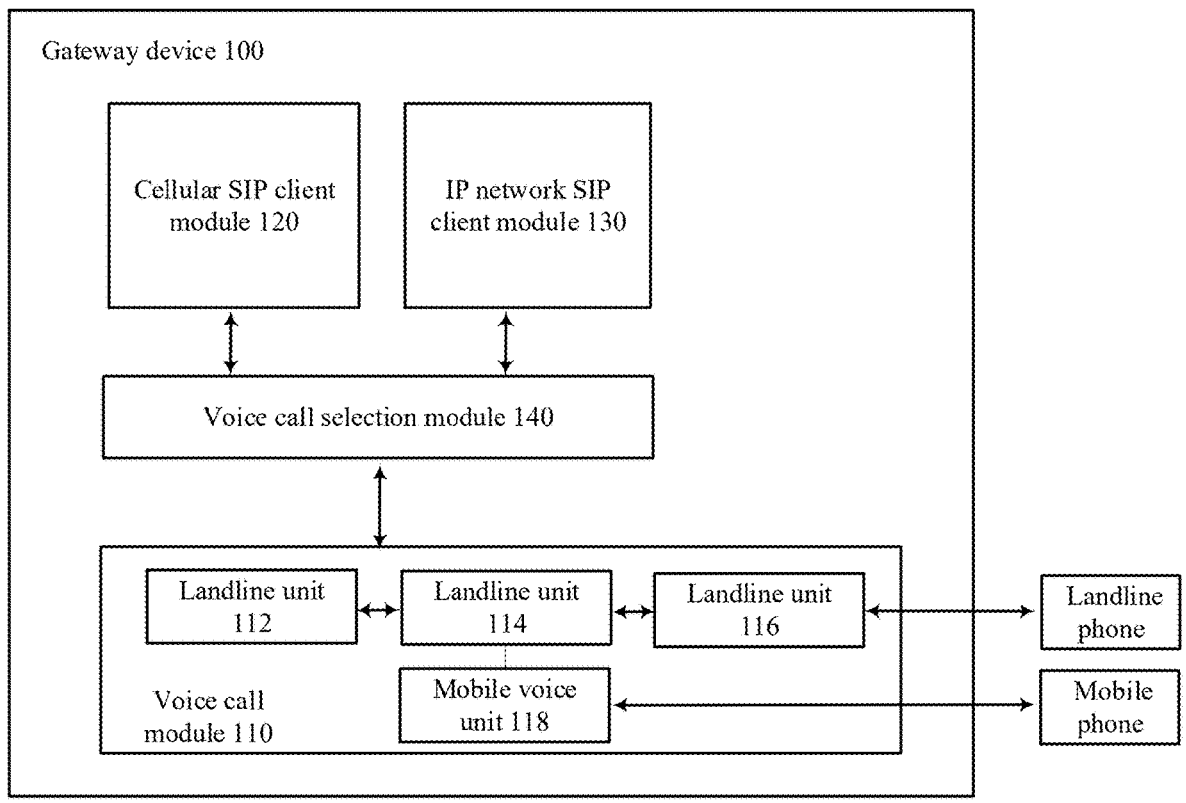
FIG. 1 is a schematic block diagram of a gateway device 100 according to one embodiment of the present disclosure.

The technical solution of the present disclosure will be clearly and completely described below in conjunction with accompanying drawings. The described embodiments are part of the embodiments of the present disclosure, but not all of them. Based on the embodiments in the present disclosure, all other embodiments acquired by ordinary skilled in the art without making any creative efforts fall within the scope of protection of the present disclosure.

Some of the drawings may not depict all the components of a given method, device, and system. Like reference numerals may be used to denote like features throughout the specification and drawings.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, whereas cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined with each other as long as no conflicts occur therebetween.

As previously mentioned, although some gateways may support both of the voice call services with VoLTE and/or VoNR and the voice call services with VoIP, the VoLTE and/or VoNR module and the VoIP module in the gateways cannot work at the same time, or two sets of slic chips for implementing the VoLTE and/or VoNR function and the VoIP function respectively are required. Thus, the cost of the gateway is increased.

In view of at least the above problem, the overall concept of the present disclosure is to provide a voice call selection method in the gateway, and thus, the cellular session initiation protocol (SIP) client module configured to process voice signalling in a cellular network and the IP network SIP client module configured to process voice signalling in an IP network can work at the same time. For example, the voice call selection module in the gateway device which may select either the cellular SIP client module or the IP network SIP client module for the calling out based on the statuses of the cellular SIP client module and the IP network SIP client module. For example, the statuses of the cellular SIP client module and the IP network SIP client module may include the idle state and/or the busy state of the cellular SIP client module and the IP network SIP client module. Thus, if the IP network SIP client module is in the busy state, the voice call selection module may select the cellular SIP client module for the voice call when the voice call selection module is in the idle state, vice versa. Moreover, according to the embodiments of the present disclosure, since the voice call selection module in the gateway device which may select one of the cellular SIP client module and the IP network SIP client module for the calling out, the cellular SIP client module and the IP network SIP client module may share the voice call module. That is, the cellular SIP client module and the IP network SIP client module may share one set of slic chip and voice interface without the requirement of the hardware switch module. Thus, it is not necessary to arrange a set of slic chip and voice interface for each of the cellular SIP client module and the IP network SIP client module. Therefore, the cost of the gateway may be reduced.

FIG. 1 is a schematic block diagram of a gateway device 100 according to one embodiment of the present disclosure. As shown in FIG. 1, the gateway device 100 includes the voice call module 110, the cellular SIP client module 120, the IP network SIP client module 130 and the voice call selection module 140.

The voice call module 110 may be connected with a landline device and/or a mobile voice device and configured to provide a calling out service to the landline device and/or the mobile voice device. According to one example of the present disclosure, the mobile voice device may be a mobile phone or the device on which the mobile voice APP is installed. According to another example of the present disclosure, the voice call module 110 may include one or more landline units, wherein each of the one or more landline units is for being connected with a landline device and configured to provide a calling out service to the landline device, and one or more mobile voice units, wherein each of the one or more mobile voice units is for being connected with a mobile voice device and configured to provide a calling out service to the mobile voice device. As shown in the FIG. 1, the voice call module 110 may include the landline units 112, 114, and 116, and the mobile voice unit 118. When the voice call module includes a plurality of landline units, the plurality of landline units may correspond to the same kind of landline network, alternatively, the plurality of landline units may correspond to the different kinds of landline networks, respectively. For example, the landline units 112, 114, and 116 may correspond to the DSP, SLIC, or RJ11 network respectively.

The cellular SIP client module 120 may be connected with a cellular network and configured to process voice signalling in a cellular network. For example, the voice signalling is VoLTE and/or VoNR signaling. The cellular SIP client module 120 may be connected with an LTE or 5G NR network and configured to process VoLTE and/or VoNR signaling from the corresponding cellular network. Moreover, the IP network SIP client module 130 may be connected with an IP network. For example, the IP network SIP client module 130 may be connected with a wide area network (WAN) via a fixed broadband connection. The fixed broadband connection may include the digital subscriber line (DSL), the passive optical network (PON), and/or the Ethernet, etc. The IP network SIP client module 130 may process the voice signalling in an IP network.

When receiving a calling out from the voice call module 110, the voice call selection module 140 may select either the cellular SIP client module 120 or the IP network SIP client module 130 for the calling out based on the statuses of the cellular SIP client module 120 and the IP network SIP client module 130. For example, the statuses of the cellular SIP client module 120 and the IP network SIP client module 130 may include the idle state and/or the busy state of the cellular SIP client module 120 and the IP network SIP client module 130. For another example, when receiving a calling out from the voice call module 110, the voice call selection module 140 may detect the states of the cellular SIP client module 120 and the IP network SIP client module 130, and select the module which is in the idle state from the cellular SIP client module 120 and the IP network SIP client module 130 for processing the calling out from the voice call module 110. Moreover, the statuses of the cellular SIP client module 120 and the IP network SIP client module 130 may further include other states of the cellular SIP client module 120 and the IP network SIP client module 130. For example, the connection state with the corresponding network of the cellular SIP client module 120 or the IP network SIP client module 130.

According one example of the present disclosure, when neither of the cellular SIP client module 120 and the IP network SIP client module 130 is idle, the voice call selection module 140 may generate a call fail message.

According another example of the present disclosure, the voice call selection module 140 may select the cellular SIP client module 120 or the IP network SIP client module 130 for the calling out further based on priorities of the cellular network and the IP network. For example, the order of the priorities may be set the manufacturer or by the user based on his or her requirement.

For example, it may be predetermined that using the IP network SIP client module 130 for processing the calling out corresponds to the highest priority, using cellular session initiation protocol (SIP) client module 120 for processing the calling out corresponds to the medium priority, and generating the call fail message corresponds to the lowest priority. Alternatively, it may be predetermined that using cellular session initiation protocol (SIP) client module 120 for processing the calling out corresponds to the highest priority, using the IP network SIP client module 130 for processing the calling out corresponds to the medium priority, and generating the call fail message corresponds to the lowest priority.

Figure 2:
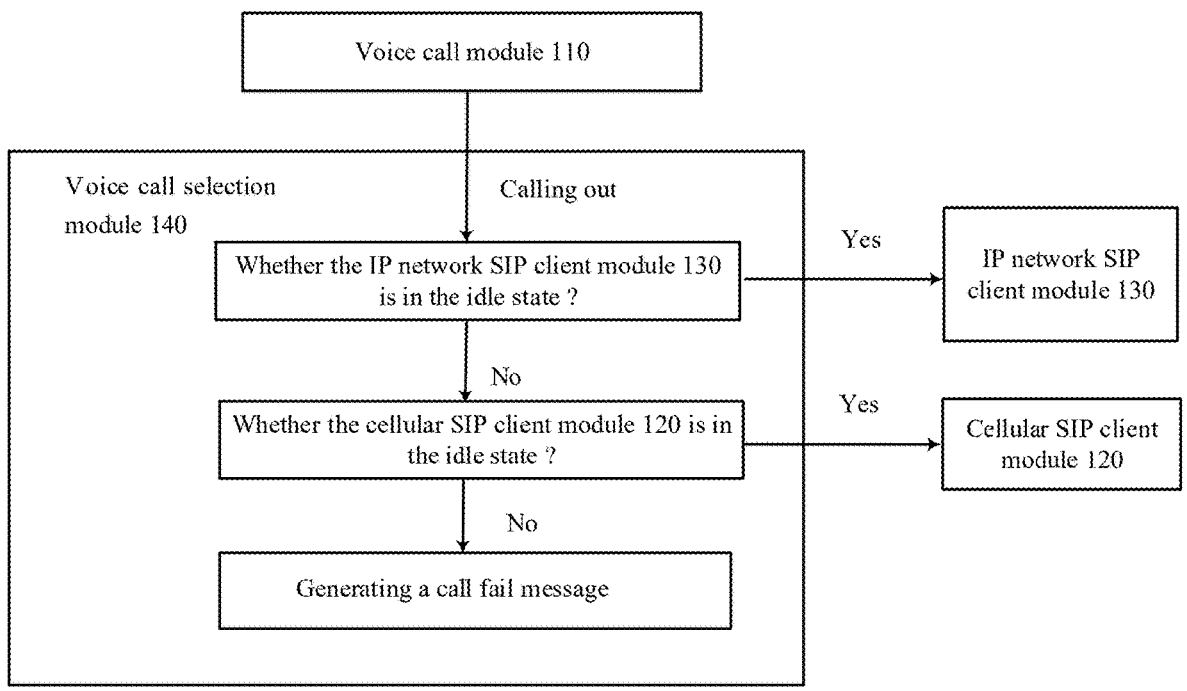
FIG. 2 is a diagram illustrating an example of selecting the SIP client modules for the calling out in accordance with the present disclosure.

FIG. 2 is a diagram illustrating an example of selecting the SIP client modules for the calling out in accordance with the present disclosure. In the example of FIG. 2, it is predetermined that using the IP network SIP client module 130 for processing the calling out corresponds to the highest priority, using cellular session initiation protocol (SIP) client module 120 for processing the calling out corresponds to the medium priority, and generating the call fail message corresponds to the lowest priority.

As shown in FIG. 2, when receiving a calling out from the voice call module 110, the voice call selection module 140 may determine whether the IP network SIP client module 130 is in the idle state based on the pre-set priorities. If the IP network SIP client module 130 is in the idle state, the voice call selection module 140 selects the IP network SIP client module 130 for the calling out.

On the other hand, if the IP network SIP client module 130 is in the busy state, the voice call selection module 140 determines whether the cellular SIP client module 120 is in the idle state based on the pre-set priorities. If the cellular SIP client module 120 is in the idle state, the voice call selection module 140 selects the cellular SIP client module 120 for the calling out. Moreover, if the cellular SIP client module 120 is in the busy state, the voice call selection module 140 generates a call fail message.

According another example of the present disclosure, each of the one or more landline units may provide a calling in service to the landline device, and each of the one or more mobile voice units is further configured to provide a calling in service to the mobile voice device. When receiving a calling in from the cellular SIP client module or the IP network SIP client module, the voice call selection module 140 may select one of the one or more landline units or one of the one or more mobile voice units for the calling in based on the idle states of the one or more landline units and the mobile voice units. Optionally, the gateway device 100 may comprises a voicemail module. When none of the one or more landline units or the one or more mobile voice units is idle, the voice call selection module may provide the calling in to the voicemail module for saving a corresponding voicemail for the incoming call.

According another example of the present disclosure, the voice call selection module 140 selects one of the one or more landline units or one of the one or more mobile voice units for the calling in further based on priorities of the landline unit(s) and/or the mobile voice unit(s). For example, the order of the priorities may be set the manufacturer or by the user based on his or her requirement. Moreover, when there are a plurality of the landline units and/or the mobile voice units in the gateway device 100. It may be predetermined the pluralities of the landline units and/or the mobile voice units respectively.

For example, it may be predetermined that using the landline unit(s) for processing the calling in corresponds to the highest priority, using the mobile voice unit(s) for processing the calling in corresponds to the medium priority, and providing the calling in to the voicemail module corresponds to the lowest priority. Alternatively, it may be predetermined that using the mobile voice unit(s) for processing the calling in corresponds to the highest priority, using the landline unit(s) for processing the calling in corresponds to the medium priority, and providing the calling in to the voicemail module corresponds to the lowest priority.

Figure 3:
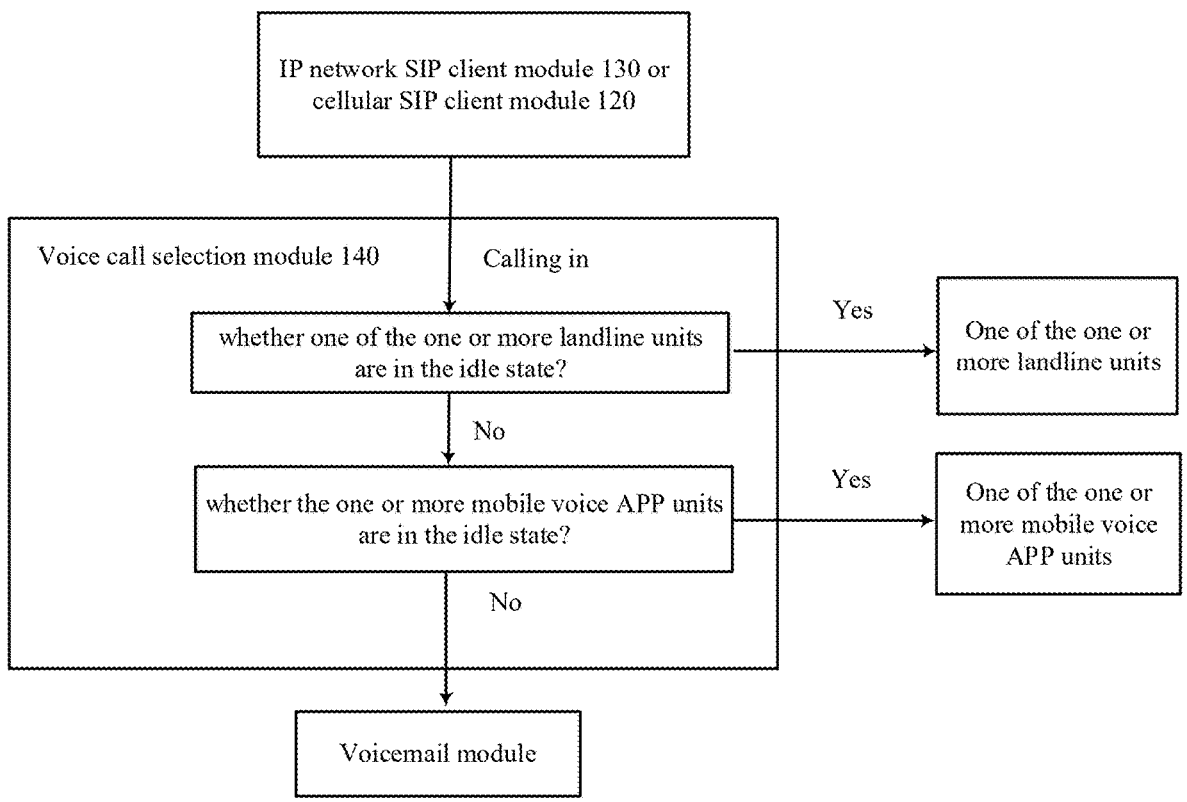
FIG. 3 is a diagram illustrating an example of selecting landline units or mobile voice units for the calling in in accordance with the present disclosure.

FIG. 3 is a diagram illustrating an example of selecting landline units or mobile voice units for the calling in in accordance with the present disclosure. In the example of FIG. 3, it is predetermined that using the landline unit(s) for processing the calling in corresponds to the highest priority, using the mobile voice unit(s) for processing the calling in corresponds to the medium priority, and providing the calling in to the voicemail module corresponds to the lowest priority.

As shown in FIG. 3, when receiving a calling in from the cellular SIP client module or the IP network SIP client module, the voice call selection module 140 may determine whether one of the one or more landline units are in the idle state based on the pre-set priorities. If one of the one or more landline units are in the idle state, the voice call selection module 140 selects one of the one or more landline units for processing the calling in.

On the other hand, if the one or more landline units are in the busy state, the voice call selection module 140 determines whether the one or more mobile voice units are in the idle state based on the pre-set priorities. If the one or more mobile voice units are in the idle state, the voice call selection module 140 selects one of the one or more mobile voice units for processing the calling in. Moreover, if all of the one or more mobile voice units are in the busy state, the voice call selection module 140 provides the calling in to the voicemail module.

Figure 4:
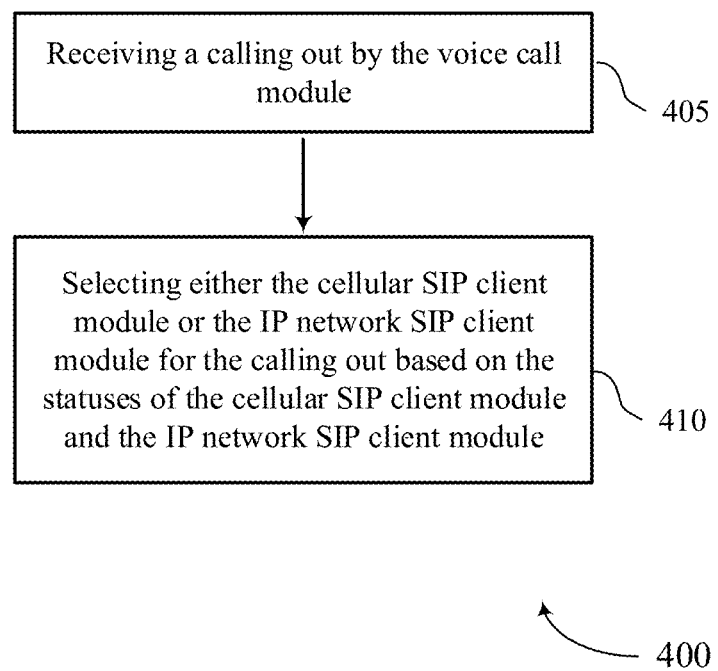
FIG. 4 shows a flowchart illustrating a method for managing voice calls at a gateway device in accordance with one embodiment of the present disclosure.

FIG. 4 shows a flowchart illustrating a method 400 for managing voice calls at a gateway device in accordance with one embodiment of the present disclosure. The gateway device comprises: a voice call module, a cellular SIP client module, and an IP network SIP client module. According to an embodiment of the present disclosure, the voice call module may be connected with a landline device and/or a mobile voice device and provide a calling out service to the landline device and/or the mobile voice device. The cellular SIP client module may be connected with a cellular network and process voice signalling in a cellular network. Moreover, the IP network SIP client module may be connected with an IP network. For example, the IP network SIP client module may be connected with an IP network via the fixed broadband connection. The IP network SIP client module may process voice signalling in an IP network. The operations of method 400 may be implemented by a gateway device as described herein. For example, the operations of method 400 may be performed by the gateway device as described with reference to FIGS. 1 through 3. In some examples, a gateway device may execute a set of instructions to control the functional elements of the gateway device to perform the functions described herein. Additionally, or alternatively, a gateway device may perform aspects of the functions described herein using special-purpose hardware.

As shown in FIG. 4, at 405, the gateway device may receive a calling out by the voice call module.

At 410, the gateway device may select either the cellular SIP client module or the IP network SIP client module for the calling out based on the statuses of the cellular SIP client module and the IP network SIP client module. For example, when receiving a calling out by the voice call module, the gateway may detect the states of the cellular SIP client module and the IP network SIP client module, and select the module which is in the idle state from the cellular SIP client module and the IP network SIP client module for processing the calling out from the voice call module.

According one example of the present disclosure, when neither of the cellular SIP client module and the IP network SIP client module is idle, the method 400 may further comprises generating a call fail message.

According another example of the present disclosure, the method 400 may further comprising selecting the cellular SIP client module or the IP network SIP client module for the calling out further based on priorities of the cellular network and the IP network. For example, the order of the priorities may be set the manufacturer or by the user based on his or her requirement.

For example, it may be predetermined that using the IP network SIP client module for processing the calling out corresponds to the highest priority, using cellular session initiation protocol (SIP) client module for processing the calling out corresponds to the medium priority, and generating the call fail message corresponds to the lowest priority. Alternatively, it may be predetermined that using cellular session initiation protocol (SIP) client module for processing the calling out corresponds to the highest priority, using the IP network SIP client module for processing the calling out corresponds to the medium priority, and generating the call fail message corresponds to the lowest priority.

Figure 5:
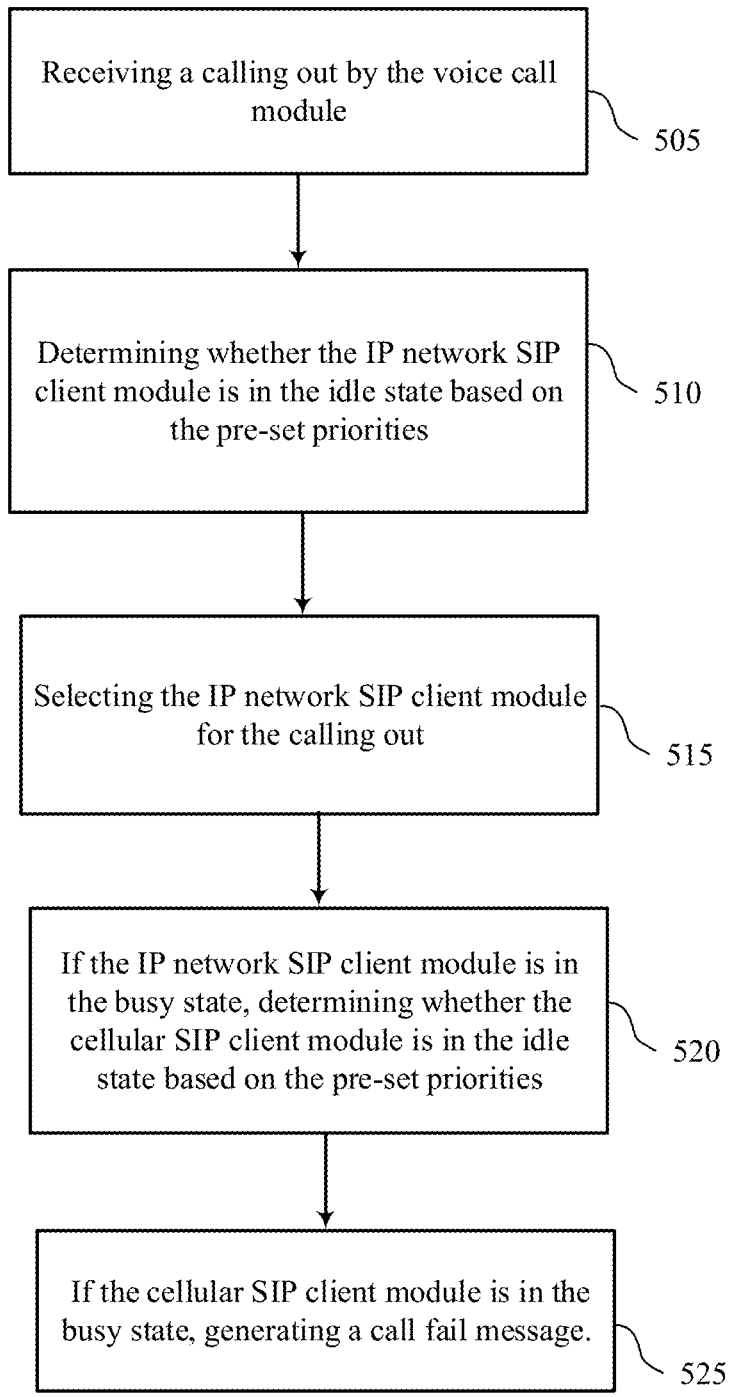
FIG. 5 shows a flowchart illustrating an example of selecting the SIP client modules for the calling out based on the statuses of the cellular SIP client module and the IP network SIP client module and priorities of the cellular network and the IP network, in accordance with an example of the present disclosure.

FIG. 5 is a flowchart illustrating an example of selecting the SIP client modules for the calling out based on the statuses of the cellular SIP client module and the IP network SIP client module and priorities of the cellular network and the IP network, in accordance with an example of the present disclosure. In the example of FIG. 5, it is predetermined that using the IP network SIP client module for processing the calling out corresponds to the highest priority, using cellular session initiation protocol (SIP) client module for processing the calling out corresponds to the medium priority, and generating the call fail message corresponds to the lowest priority.

As shown in FIG. 5, at 505, the gateway device may receive a calling out by the voice call module. At 510, the gateway device may determine whether the IP network SIP client module is in the idle state based on the pre-set priorities. If the IP network SIP client module is in the idle state, at 515, the gateway device selects the IP network SIP client module for the calling out.

On the other hand, if the IP network SIP client module is in the busy state, at 520, the gateway device may determine whether the cellular SIP client module is in the idle state based on the pre-set priorities. If the cellular SIP client module is in the idle state, the at 525, the gateway may select the cellular SIP client module for the calling out. Moreover, if the cellular SIP client module is in the busy state, at 525, the gateway may generate a call fail message.

According another example of the present disclosure, the voice call module comprises one or more landline units, wherein each of the one or more landline units is for being connected with a landline device and configured to provide a calling out service to the landline device, and one or more mobile voice units, wherein each of the one or more mobile voice units is for being connected with a mobile voice device and configured to provide a calling out service to the mobile voice device. Moreover, each of the one or more landline units may provide a calling in service to the landline device, and each of one or more mobile voice units may provide a calling in service to the mobile voice device.

Figure 6:
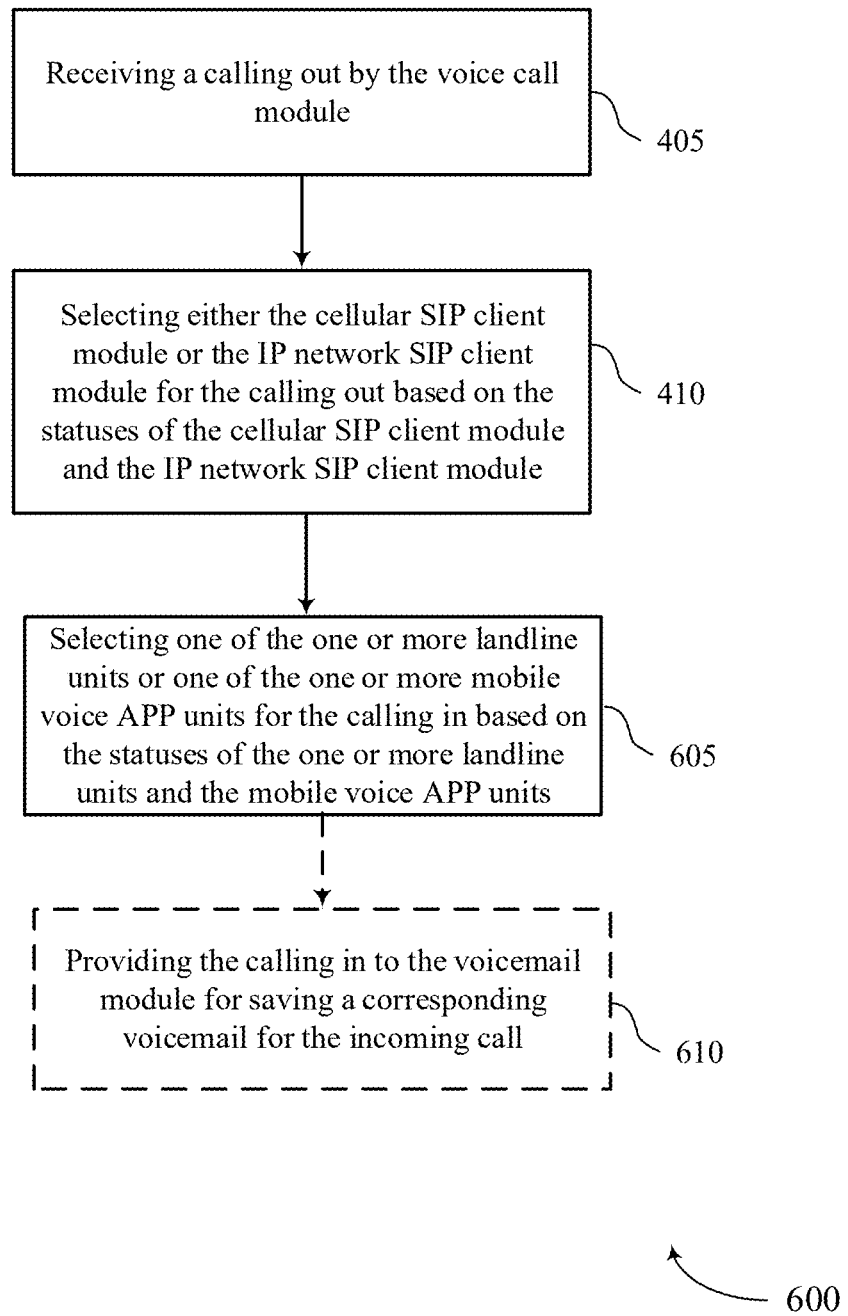
FIG. 6 is a flowchart illustrating a method for managing voice calls at a gateway device in accordance with another embodiment of the present disclosure.

FIG. 6 shows a flowchart illustrating a method 600 for managing voice calls at a gateway device in accordance with another embodiment of the present disclosure. Steps 405 and 410 in the method 600 are the same as steps 405 and 410 in the method 400 which have been described in combined with FIG. 4 and FIG. 5. Moreover, as shown in FIG. 6, at 605, when receiving a calling in from the cellular SIP client module or the IP network SIP client module, the gateway device may select one of the one or more landline units or one of the one or more mobile voice units for the calling in based on the statuses of the one or more landline units and the mobile voice units. Optionally, the gateway device may comprise a voicemail module. When none of the one or more landline units or the one or more mobile voice units is idle, at 610, the gateway may further provide the calling in to the voicemail module for saving a corresponding voicemail for the incoming call.

According another example of the present disclosure, the method 600 may further comprise selecting one of the one or more landline units or one of the one or more mobile voice units for the calling in further based on priorities of the landline unit(s) and/or the mobile voice unit(s). For example, the order of the priorities may be set the manufacturer or by the user based on his or her requirement. Moreover, when there are a plurality of the landline units and/or the mobile voice units in the gateway device. It may be predetermined the pluralities of the landline units and/or the mobile voice units respectively.

For example, it may be predetermined that using the landline unit(s) for processing the calling in corresponds to the highest priority, using the mobile voice unit(s) for processing the calling in corresponds to the medium priority, and providing the calling in to the voicemail module corresponds to the lowest priority. Alternatively, it may be predetermined that using the mobile voice unit(s) for processing the calling in corresponds to the highest priority, using the landline unit(s) for processing the calling in corresponds to the medium priority, and providing the calling in to the voicemail module corresponds to the lowest priority.

Figure 7:
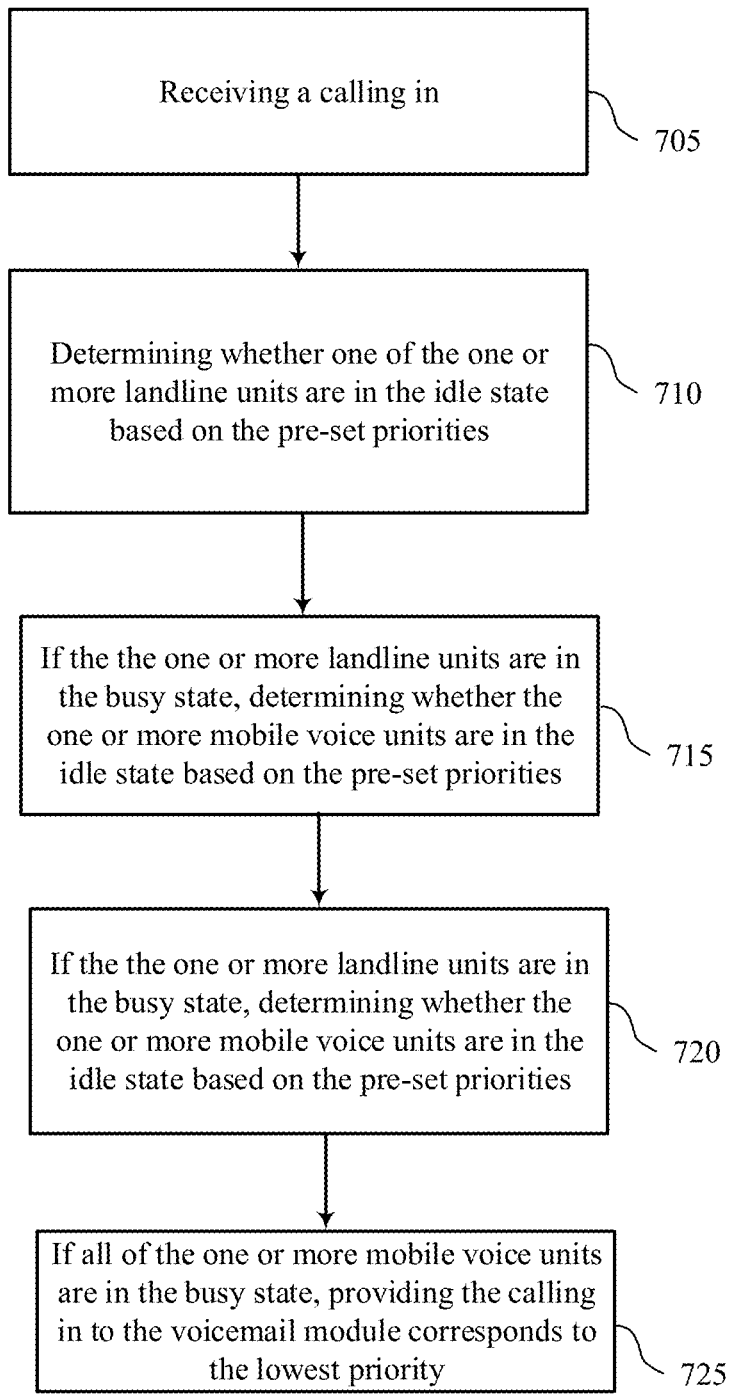
FIG. 7 is a flowchart illustrating an example of selecting the landline units and the mobile voice units for the calling in based on the statuses of the one or more landline units and the one or more mobile voice units and priorities of the one or more landline units and the one or more mobile voice units.

FIG. 7 is a flowchart illustrating an example of selecting the landline units and the mobile voice units for the calling in based on the statuses of the one or more landline units and the one or more mobile voice units and priorities of the one or more landline units and the one or more mobile voice units. In the example of FIG. 7, it is predetermined that using the landline unit(s) for processing the calling in corresponds to the highest priority, using the mobile voice unit(s) for processing the calling in corresponds to the medium priority, and providing the calling in to the voicemail module corresponds to the lowest priority.

As shown in FIG. 7, at 705, the gateway may receive a calling. At 710, the gateway may determine whether one of the one or more landline units are in the idle state based on the pre-set priorities. If one of the one or more landline units are in the idle state, at 710, the gateway may select one of the one or more landline units for processing the calling in.

On the other hand, if the one or more landline units are in the busy state, at 715, the gateway may determine whether the one or more mobile voice units are in the idle state based on the pre-set priorities. If the one or more mobile voice units are in the idle state, at 720, the gateway may select one of the one or more mobile voice units for processing the calling in. Moreover, if all of the one or more mobile voice units are in the busy state, at 725, the gateway may provide the calling in to the voicemail module corresponds to the lowest priority.

Figure 8:
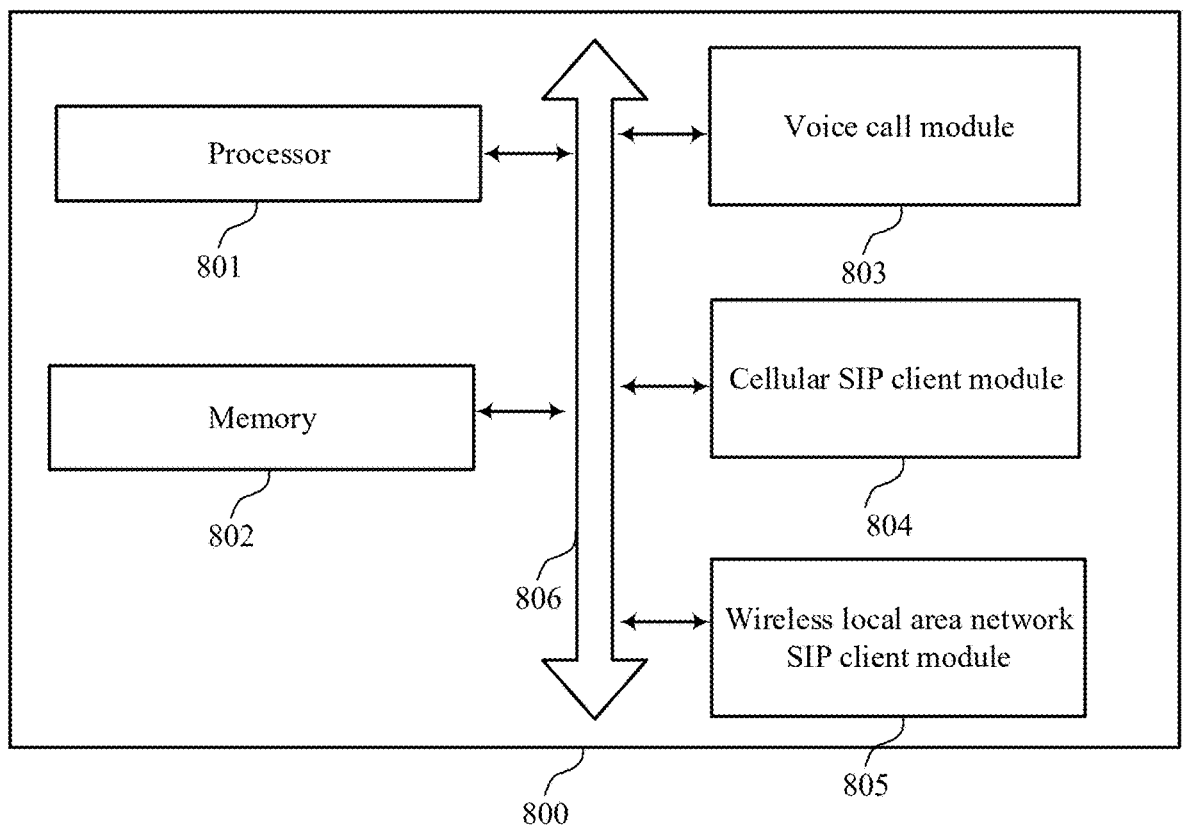
FIG. 8 is a schematic block diagram of the gateway 800 according to one embodiment of the present disclosure.

FIG. 8 is a schematic block diagram of the gateway 800 according to one embodiment of the present disclosure. It should be noted that the gateway 800 depicted in FIG. 8 may correspond to the gateway as described above and may be used to perform the operations related to managing voice calls as described in the above with respect to method 400 and method 600.

As shown in FIG. 8, the gateway 800 may comprise processor 801, and memory 802, a voice call module 803, a cellular SIP client module 804 and an IP network SIP client module 805. These components may be in electronic communication via one or more buses (e.g., bus 806). Processor 801 is communicatively coupled with the memory and configured to perform steps in FIGS. 4-7 as discussed above.

Examples of processor 801 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

Processor 801 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 802.

Memory 802 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software (e.g. code and/or instructions) that may be accessed and read by a computer. Memory 802 may reside in processor 801, external to processor 801, or distributed across multiple entities including processor 801. Memory 802 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

The cellular SIP client module 804 and the IP network SIP client module 805 may communicate bi-directionally, via one or more antennas, wired or wireless links. Moreover, the cellular SIP client module 804 may process voice signalling in a cellular network, and the IP network SIP client module 805 may process voice signalling in an IP network.

The voice call module 803, may communicate bi-directionally, via one or more antennas, wired or wireless links with landline phones or mobile phones. The voice call module is described in FIG. 4, thus, the details are omitted.

In addition, according to another embodiment of the present disclosure, a computer program product for controlling the bandwidth of a channel including a plurality of subchannels is disclosed. As an example, the computer program product comprises a non-transitory computer readable storage medium having program instructions embodied therewith, and the program instructions are executable by a processor. When executed, the program instructions cause the processor to perform one or more of the procedures above described, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

An expression such as "according to", "based on", "depend on", and so on as used in the disclosure does not mean "according only to", "based only on", or "dependent only on", unless it is explicitly otherwise stated. In other words, such expression generally means "according at least to", "based at least on", or "depend at least on" in the disclosure.

Any reference in the disclosure to an element using the designation "first", "second" and so forth is not intended to comprehensively limit the number or order of such elements. These expressions may be used in the disclosure as a convenient method for distinguishing two or more units. Thus, a reference to a first unit and a second unit does not imply that only two units may be employed or that the first unit must precede the second unit in some form.

The term "determining" used in the disclosure may include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth may also be regarded as "determining". That is, regarding "determining", several actions may be regarded as "determining".

The terms such as "connected", "coupled" or any of their variants used in the disclosure refer to any connection or combination, direct or indirect, between two or more units, which may include the following situations: between two units that are "connected" or "coupled" with each other, there are one or more intermediate units. The coupling or connection between the units may be physical or logical or may also be a combination of the two. As used in the disclosure, two units may be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

It should be noted that the above description is only some embodiments of the present disclosure and an illustration of the applied technical principles. It should be understood by those skilled in the art that the present disclosure scope involved in the present disclosure is not limited to the technical solutions resulting from specific combinations of the above technical features, but also encompasses other technical solutions resulting from any combination of the above technical features or their equivalents without departing from the above disclosed concept, for example, the technical solutions formed by replacing between the above features and the technical features with similar functions disclosed in the present disclosure (but not limited hereto).

The present disclosure has been described in detail above, but it is obvious to those skilled in the art that the present disclosure is not limited to the embodiments described in the disclosure. The present disclosure may be implemented as a modified and changed form without departing from the spirit and scope of the present disclosure defined by the description of the claims. Therefore, the description in the disclosure is for illustration and does not have any limiting meaning to the present disclosure.

What is claimed is:

1. A gateway device, comprising
a voice call module for being connected with a landline device and/or a mobile voice device and configured to provide a calling out service to the landline device and/or the mobile voice device;
a cellular session initiation protocol (SIP) client module for being connected with a cellular network and configured to process voice signalling in a cellular network;
an IP network SIP client module for being connected with an IP network and configured to process voice signalling in an IP network; and
a voice call selection module configured to, when receiving a calling out from the voice call module, select either the cellular SIP client module or the IP network SIP client module for the calling out based on statuses of the cellular SIP client module and the IP network SIP client module, wherein
the statuses of the cellular SIP client module and the IP network SIP client module include the idle state and/or the busy state of the cellular SIP client module and the IP network SIP client module.

2. The gateway device of claim 1, wherein
the voice call selection module is configured to select the cellular SIP client module or the IP network SIP client module for the calling out further based on priorities of the cellular network and the IP network.

3. The gateway device of claim 1, wherein
the voice call selection module is further configured to generate a call fail message when neither of the cellular SIP client module and the IP network SIP client module is idle.

4. The gateway device of claim 1, wherein the voice call module comprises:
one or more landline units, wherein each of the one or more landline units is for being connected with a landline device and configured to provide a calling out service to the landline device, and
one or more mobile voice units, wherein each of the one or more mobile voice units is for being connected with a mobile voice device and configured to provide a calling out service to the mobile voice device.

5. The gateway device of claim 1, wherein
the voice signalling is Voice over Long Term Evolution (VoLTE) and/or Voice over New Radio (VoNR) signalling, and
the voice signalling is Voice over IP (VoIP) signalling.

6. The gateway device of claim 4, wherein
each of the one or more landline units is further configured to provide a calling in service to the landline device;
each of one or more mobile voice units is further configured to provide a calling in service to the mobile voice device; and
the voice call selection module is further configured to, when receiving a calling in from the cellular SIP client module or the IP network SIP client module, select one of the one or more landline units or one of the one or more mobile voice units for the calling in based on statuses of the one or more landline units and the mobile voice units.

7. The gateway device of claim 6, wherein
the voice call selection module selects one of the one or more landline units or one of the one or more mobile voice units for the calling in further based on priorities of the landline units and/or the mobile voice units.

8. The gateway device of claim 6, further comprising a voicemail module, wherein
the voice call selection module is further configured to provide the calling in to the voicemail module, when none of the one or more landline units or the one or more mobile voice units is idle.

9. The gateway device of claim 4, wherein
each of the one or more landline units correspond to a kind of landline network.

10. A method for managing voice calls at a gateway device, wherein
the gateway device comprises:
a voice call module for being connected with a landline device and/or a mobile voice device and configured to provide a calling out service to the landline device and/or the mobile voice device;
a cellular session initiation protocol (SIP) client module for being connected with a cellular network and configured to process voice signalling in a cellular network;
an IP network SIP client module for being connected with an IP network and configured to process voice signalling in an IP network, and
the method comprises:
receiving a calling out by the voice call module, and
selecting either the cellular SIP client module or the IP network SIP client module for the calling out based on statuses of the cellular SIP client module and the IP network SIP client module, wherein
the statuses of the cellular SIP client module and the IP network SIP client module include the idle state and/or the busy state of the cellular SIP client module and the IP network SIP client module.

11. The method of claim 10, further comprising:
selecting the cellular SIP client module or the IP network SIP client module for the calling out further based on priorities of the cellular network and the IP network.

12. The method of claim 10, further comprising:
generating a call failed message, when neither of the cellular SIP client module and the IP network SIP client module is idle.

13. The method of claim 10, wherein the voice call module comprises:

one or more landline units, wherein each of the one or more landline units is for being connected with a landline device and configured to provide a calling out service to the landline device, and one or more mobile voice units, wherein each of the one or more mobile voice units is for being connected with a mobile voice device and configured to provide a calling out service to the mobile voice device, each of the one or more landline units is further configured to provide a calling in service to the landline device, each of one or more mobile voice units is further configured to provide a calling in service to the mobile voice device, and the method further comprises:

receiving a calling in from the cellular SIP client module or the IP network SIP client module, and selecting one of the one or more landline units or one of the one or more mobile voice units for the calling in based on statuses of the one or more landline units and the one or more mobile voice units.

14. The method of claim 13, further comprising selecting one of the one or more landline units or one of the one or more mobile voice units for the calling in further based on priorities of the one or more landline units and the one or more mobile voice units.

15. The method of claim 13, wherein the gateway device further comprises a voicemail module, the method further comprises:

providing the calling in to the voicemail module, when none of the one or more landline units or the one or more mobile voice units is idle.

\* \* \* \* \*